United States Patent
Miao et al.

(10) Patent No.: US 12,238,640 B2
(45) Date of Patent: Feb. 25, 2025

(54) METHOD FOR CHANNEL SWITCHING IN WIRELESS MESH NETWORK, AND WIRELESS DEVICE

(71) Applicant: HANGZHOU EZVIZ SOFTWARE CO., LTD., Hangzhou (CN)

(72) Inventors: Yongzhi Miao, Hangzhou (CN); Zhisheng Shan, Hangzhou (CN); Wei Jin, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 365 days.

(21) Appl. No.: 17/789,815

(22) PCT Filed: Dec. 24, 2020

(86) PCT No.: PCT/CN2020/139018
§ 371 (c)(1),
(2) Date: Jun. 29, 2022

(87) PCT Pub. No.: WO2021/136062
PCT Pub. Date: Jul. 8, 2021

(65) Prior Publication Data
US 2023/0042022 A1  Feb. 9, 2023

(30) Foreign Application Priority Data
Dec. 31, 2019  (CN) .......... 201911417329.7

(51) Int. Cl.
*H04W 48/16* (2009.01)
*H04W 48/18* (2009.01)
*H04W 84/20* (2009.01)

(52) U.S. Cl.
CPC .......... *H04W 48/16* (2013.01); *H04W 48/18* (2013.01); *H04W 84/20* (2013.01)

(58) Field of Classification Search
CPC ..... H04W 48/16; H04W 48/18; H04W 84/18; H04W 84/20; H04W 36/035; H04W 36/06; H04W 76/19
(Continued)

(56) References Cited

U.S. PATENT DOCUMENTS

2006/0083197 A1   4/2006  Kang
2009/0129273 A1*  5/2009  Zou ....................... H04W 36/06
                                                                370/235
(Continued)

FOREIGN PATENT DOCUMENTS

CN   101621836   1/2010
CN   101621837   1/2010
(Continued)

OTHER PUBLICATIONS

International Search Report and Written Opinion issued in Corresponding PCT Application No. PCT/CN2020/139018, dated Mar. 22, 2021 (English Translation provided).
(Continued)

*Primary Examiner* — Hirdepal Singh
(74) *Attorney, Agent, or Firm* — NORTON ROSE FULBRIGHT US LLP (57) ABSTRACT

Disclosed is a method for channel switching in a wireless mesh network. The method comprises: any slave node in a wireless mesh network receiving a channel switching command broadcast by a master node to perform channel switching; the slave node determining whether the channel switching is successful; and if successful, searching for the master node or a mesh network containing the master node for networking; otherwise, exiting the current invalid mesh network, and scanning for a mesh network after the channel switching, and joining the detected mesh network. According to the present application, after channel switching is
(Continued)

performed, a mesh network for a slave node is automatically configured, thereby making up for the defect of an existing mesh network protocol not supporting switching between different frequency bands, and realizing automatic re-establishment of a mesh connection after the channel switching is successful.

15 Claims, 4 Drawing Sheets

(58) Field of Classification Search
USPC .......................................................... 455/434
See application file for complete search history.

(56) References Cited

U.S. PATENT DOCUMENTS

| | | | |
|---|---|---|---|
| 2016/0277948 | A1 | 9/2016 | Yeo et al. |
| 2017/0041954 | A1* | 2/2017 | Tsai ................. G01S 7/021 |
| 2018/0359730 | A1* | 12/2018 | Jung ................. H04K 3/822 |
| 2022/0060961 | A1* | 2/2022 | Qi ................. H04W 40/248 |

FOREIGN PATENT DOCUMENTS

| CN | 102026306 | 4/2011 |
|---|---|---|
| CN | 102098706 | 6/2011 |
| CN | 102548038 | 7/2012 |
| CN | 102857327 | 1/2013 |
| CN | 103428899 | 12/2013 |
| CN | 105451290 | 3/2016 |
| CN | 105873083 | 8/2016 |
| CN | 106879039 | 6/2017 |
| CN | 109379772 | 2/2019 |
| CN | 110536251 | 12/2019 |

OTHER PUBLICATIONS

Extended European Search Report issued in corresponding European Application No. 2091122.0, dated Jun. 7, 2023.

Roy et al. "Fast multichannel switching for IEEE 802.11s multiradio wireless mesh networks", $6^{th}$ IEEE International Workshop, Dec. 5, 2011, pp. 303-308.

"IEEE Standard for information technology-telecommunications and information exchange between systems—Local and metropolitan area networks-specific requirements Part 11: Wireless LAN Medium Access Control (MAC) and Physical Layer (PHY) specifications Amendment 10: Mesh Networking", *IEEE Standard*, Sep. 10, 2011, 372 pages.

* cited by examiner

FIG. 1

S201 Receiving a channel switching command sent by a master node, wherein the channel switching command indicates switching from a channel to a target channel, and a frequency band of the target channel is different from a frequency band of the channel currently used by the slave node S202 Performing channel switching according to the channel switching command S203 In the case of failing to switch to the target channel, exiting an invalid first mesh network where the slave node is currently located, and scanning and joining a second mesh network composed of nodes switched to the target channel

METHOD FOR CHANNEL SWITCHING IN WIRELESS MESH NETWORK, AND WIRELESS DEVICE

CROSS REFERENCE TO RELATED APPLICATIONS

The present application is a national phase application under 35 U.S.C. § 371 of International Application No. PCT/CN2020/139018, filed Dec. 24, 2020, which claims the benefit of priority to Chinese patent application No. 201911417329.7 filed with the China National Intellectual Property Administration on Dec. 31, 2019 and entitled "Method for Channel Switching in Wireless mesh Network, and Wireless Device", the contents of each of which are incorporated herein by reference in their entirety.

TECHNICAL FIELD

The present application relates to a field of wireless mesh network access, and in particular, to a method for channel switching in a wireless mesh network, and a wireless device.

BACKGROUND

Wireless mesh network technology is a Wireless Fidelity (WiFi) networking mode, and is a mesh structure network, also known as "multi-hop" network. In the mesh network, various devices in the network are regarded as nodes; Different from the traditional star network topology, all nodes in the mesh network can be connected to each other, and each node can have multiple connection channels, and all nodes form a whole network. Mesh includes both mesh networks based on 802.11s protocol and mesh networks based on non-802.11s protocol.

It is feasible for conventional dual-band WiFi network cards to switch channels in the same frequency band and between different frequency bands of 2.4G and 5G. After an Access Point (AP) device switches the frequency band, as long as a subscriber station (a station that communicates with the mesh network via AP, which is usually referred to a conventional 802.11 subscriber terminal) supports both 2.4G and 5G, the subscriber station will automatically follow and switch to the frequency band in which AP operates.

As the mesh network itself does not support channel switching between different frequency bands, and there are defects in the channel switching in the same frequency band, 802.11s spec also clearly indicates that it does not support channel switching between different frequency bands. This will cause the network card device unable to realize the channel switching between different frequency bands in the mesh network.

SUMMARY

Embodiments of the present application provide a method for channel switching in a wireless mesh network, and a wireless device, so that a node (wireless node device) with a network card can support the switching of channels between different frequency bands in a mesh network.

In a first aspect, the present application provides a method for channel switching in a wireless mesh network, comprising: any slave node in the wireless mesh network receiving a channel switching command broadcast by a master node to perform channel switching; the slave node determining whether the channel switching is successful, if the channel switching is successful, the slave node searching for the master node or a mesh network containing the master node for networking, if the channel switching is not successful, the slave node exiting a current invalid mesh network, scanning a mesh network after the channel switching, and joining in the scanned mesh network.

In an implementation, after the slave node is successfully switched, the method further comprises: marking the networking as a valid mesh network, adding node information of the valid mesh network into a beacon frame, and broadcasting the beacon frame carrying the node information of the valid mesh network.

In an implementation, exiting the current invalid mesh network comprises:

the slave node receiving a status of the current mesh network synchronized in the current mesh network broadcast through a second layer of network by the master node, and filling a valid mesh network node mark information into the beacon frame;

determining whether the current mesh network belongs to an invalid mesh network depending on whether there is master node information based on the synchronized information of the current mesh network, and if the current mesh network belongs to an invalid mesh network, exiting the current invalid mesh network; wherein the beacon frame is a beacon frame or a probe response frame, and the valid mesh network mark information is filled into a private IE field of the beacon frame or probe response frame.

In an implementation, scanning the mesh network after the channel switching, and joining in the scanned mesh network comprises: when the private IE field carried by the beacon frame or probe response frame broadcast by the mesh node scanned by the slave node contains the valid mesh network mark information, and a service set identifier ssid of the slave node is consistent with a service set identifier ssid of the scanned mesh node, the slave node joining the valid mesh network.

In an implementation, joining in the scanned mesh network comprises: the slave node broadcasting a probe request frame; receiving a probe response frame from the master node, wherein the probe response frame carries the master node information comprising the mesh network valid mark information; obtaining the master node information according to the master node information carried in the probe response frame, and establishing a wireless link.

In an implementation, the channel switching command comprises the beacon frame or the probe response frame, and wherein a channel switch announcement element and a channel switch parameter element carried in the frame comprise a channel switching time and a channel switching indication for indicating a switching target.

In a second aspect, the present application provides a method for channel switching in a wireless mesh network, comprising: each slave node in a wireless mesh network receiving a channel switching command broadcast by a master node, and each slave node performing channel switching respectively; a first slave node whose channel is successfully switched searching for the master node or searching for a mesh network containing the master node for networking; a second slave node whose channel is not successfully switched determining whether it has accessed an invalid mesh network currently, if the second slave node has accessed the invalid mesh network, the second slave node exiting the current invalid mesh network, scanning a mesh network after channel switching, and joining in the scanned mesh network.

In a third aspect, the present application provides a method for channel switching in a wireless mesh network, which is applied to a slave node in the wireless mesh network, the method comprises: receiving a channel switching command sent by a master node, wherein the channel switching command indicates switching from a channel to a target channel, and a frequency band of the target channel is different from a frequency band of the channel currently used by the slave node; performing channel switching according to the channel switching command; in a case of failing to switch to the target channel, exiting an invalid first mesh network where the slave node is currently located, and scanning and joining a second mesh network composed of nodes switched to the target channel.

In a fourth aspect, the present application provides a method for channel switching in a wireless mesh network, which is applied to a master node in the wireless mesh network, the method comprises: broadcasting a channel switching command based on a currently used channel, wherein the channel switching command indicates switching from a channel to a target channel, and a frequency band of the target channel is different from a frequency band of the channel currently used by the master node; switching from the used channel to the target channel; broadcasting a beacon frame based on the target channel, wherein the beacon frame comprises node information of the master node; receiving a networking request sent by a slave node according to the beacon frame, and networking with the slave node according to the networking request.

In a fifth aspect, the present application provides an apparatus for channel switching in a wireless mesh network, which is applied to a slave node in the wireless mesh network, comprising: a channel switching command receiving module configured for receiving a channel switching command sent by a master node, wherein the channel switching command indicates switching from a channel to a target channel, and a frequency band of the target channel is different from a frequency band of the channel currently used by the slave node; a channel switching executing module configured for performing channel switching according to the channel switching command; a mesh network scanning module configured for, in a case of failing to switch to the target channel, exiting an invalid first mesh network where the slave node is currently located, and scanning and joining a second mesh network composed of nodes switched to the target channel.

In sixth aspect, the present application provides an apparatus for channel switching in a wireless mesh network, which is applied to a master node in the wireless mesh network, comprising: a channel switching command broadcasting module configured for broadcasting a channel switching command based on a currently used channel, wherein the channel switching command indicates switching from a channel to a target channel, and a frequency band of the target channel is different from a frequency band of the channel currently used by the master node; a target channel switching module configured for switching from the used channel to the target channel; a beacon frame broadcasting module configured for broadcasting a beacon frame based on the target channel, wherein the beacon frame comprises node information of the master node; a networking request receiving module configured for receiving a networking request sent by the slave node according to the beacon frame, and networking with the slave node according to the networking request.

In a seventh aspect, the present application further provides a wireless device, comprising a network access module supporting wireless local area network access, wherein the network access module comprises a memory and a processor, wherein: the memory stores thereon application programs; the processor executes the application programs to implement steps in any one of the methods for channel switching in the wireless mesh network in the present application.

In an eighth aspect, the present application provides a wireless mesh network system comprising a wireless device as a node, wherein each slave node in the wireless mesh network receives a channel switching command broadcast by a master node, and each slave node performs channel switching respectively; a first slave node whose channel is successfully switched searches for the master node or searches for a mesh network containing the master node for networking; a second slave node whose channel is not successfully switched determines whether it has accessed an invalid mesh network currently, if the second slave node has accessed the invalid mesh network, the second slave node exits the current invalid mesh network, scans a mesh network after channel switching, and joins the scanned mesh network.

In a ninth aspect, the present application provides a computer readable storage medium having stored thereon computer programs that, upon executed by a processor, cause the processor to implement steps in any one of the methods for channel switching in the wireless mesh network.

In the present application, after receiving the channel switching command broadcast by the master node and performing channel switching, if the channel switching is successful, the slave node searches for the master node or a network containing the master node for networking; if the channel switching is not successful, the slave node exits an invalid mesh network, scans the mesh network after the channel switching, and joins the scanned mesh network, so that the mesh network for the slave node is automatically configured after the channel switching, thereby making up the defect that the existing mesh network protocol does not support switching between different frequency bands, and realizing automatic re-establishment of mesh connection after the channel switching is successful, restoring mesh networking, and restoring normal mesh communication capability, which facilitates the channel switching of the mesh network, so that the wireless devices in the mesh network can switch to any better channel at any time, so that the data transmission performance of the mesh network is higher, it is not easy to drop line, and the maintenance of the mesh network is easier. The switching channel of the present application is not limited by frequency bands, and not only supports the switching between single-frequency network card channels, but also supports the switching of channels across frequency bands between dual-frequency network cards.

BRIEF DESCRIPTION OF THE DRAWINGS

In order to describe the technical solution of the embodiments of the present application and the prior art more clearly, drawings used in the embodiments and the prior art will be described briefly below. Obviously, the drawings described below are only for some embodiments of the present application, and those skilled in the art can obtain other drawings according to these drawings without any inventive efforts.

DETAILED DESCRIPTION

In order to make the objects, technical solutions, and advantages of the present application more clear, the present application will be further described in detail below with reference to the accompanying drawings and embodiments. Obviously, the embodiments described are only some of the embodiments of the present application instead of all of them. All other embodiments obtained by those of ordinary skills in the art based on the embodiments herein without any creative efforts are within the scope of the present application.

The existing 802.11s protocol specifies that channel switching may not successfully move all mesh subscriber stations in MBSS (Mesh Base Service Set) to a new channel; switching to the new channel will not destroy the mesh peer operation, and the existing mesh peer operation may be remained in the new channel. At present, the mesh network only supports the channel switching in the same frequency band, but not the channel switching between different frequency bands, which makes the wireless devices supporting dual-band Wi-Fi network cards unable to realize the channel switching between different frequency bands in the mesh network.

In the present application, the wireless devices in the mesh network are configured as follows: a master node is determined according to a level of each device in the mesh network, and devices in the mesh network other than the master node are slave nodes. Since different types of network devices have different levels of factory settings, for example, a mesh router has the highest level, while the nodes of other mesh terminal devices have a lower level, so the master node is selected as a management node according to levels from high to low. When there are multiple nodes of the same level in the network, it is determined according to other parameters such as mac address, the type of network egress port, etc. As the management node, the master node is responsible for managing the mesh network, distributing the network for all mesh nodes in the mesh network, providing DHCP server, initiating frequency band and channel switching, making network optimization decisions, collecting and synchronizing mesh topology information, etc. There is only one master node and more than one slave node in a mesh network.

In the present application, after the master node initiates a switching command to slave nodes, the channel switching between different frequency segments/different frequency bands may be realized through the automatic network distribution of the slave nodes.

Figure 1:
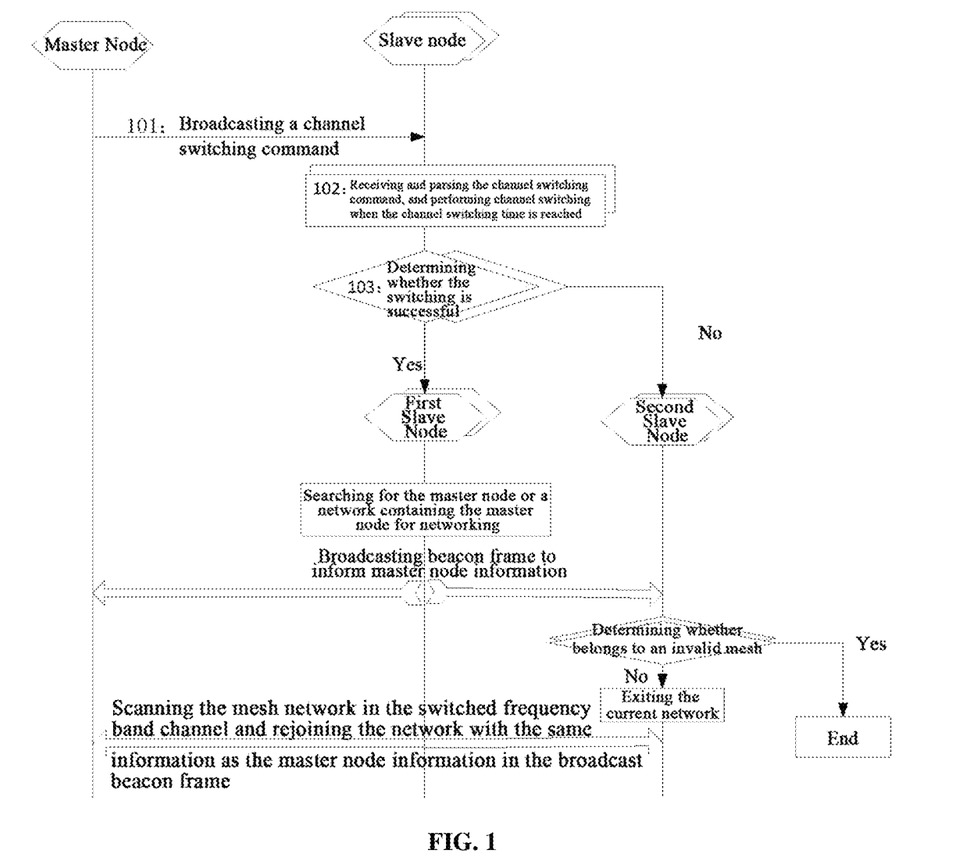
FIG. 1 is a flowchart of implementing channel switching between different frequency bands according to an embodiment of the present application.

Referring to FIG. 1, FIG. 1 is a flowchart of implementing channel switching between different frequency bands, the switching method includes:

Step 101, a master node broadcasts a channel switching command to all slave nodes to inform all slave nodes to perform channel switching, the command is a beacon frame or a probe response frame carrying a channel switch announcement element and a mesh channel switch parameter element, wherein, the carried channel switch announcement element and the channel switch parameter element include a channel switching time and a channel switching indication for indicating a switching target.

Step 102, each slave node receives and parse the channel switching command respectively, counts time, and performs channel switching when the channel switching time is reached; for example, if countdown is performed, the channel switching is triggered when countdown to 0.

Step 103, each slave node determines whether the channel switching is successful;

where, a first slave node whose channel is successfully switched searches for the master node or searches for a network containing the master node for networking, and the current networking is marked as a valid mesh network, so as to make the first slave node access the valid mesh network; node information of the valid mesh network is filled into a beacon frame; the beacon frame carrying the node information of the valid mesh network broadcasts through a multi-channel negotiation mechanism for mesh to inform other nodes. Here, since broadcasting implemented through the beacon frame, the beacon frame can be received through Wi-Fi even if each node does not locate in the same mesh network.

A second slave node whose channel is not successfully switched will remain in the current mesh network, and a status of the mesh network is synchronized in the mesh network by broadcasting the status through the second layer of network, the status includes network health status, throughput information, mesh path information of each mesh device, and status information of the overall mesh network, mesh heartbeat, network validity, mesh network topology, master node information, etc. After synchronizing the information of the current mesh network, it is determined whether a second node belongs to an invalid mesh network depending on whether there is master node information, and if the second node finds that there is no master node in the network, the second node exits the current invalid mesh network and disconnects the current mesh network connection; after exiting the current mesh network, the second slave node scans a mesh network in a switched frequency band channel, and when a scanned beacon frame contains master node information, and the master node information such as ID is the same as the master node information in the node information of the valid mesh network carried in the broadcast beacon frame, the second slave node requests to join the scanned mesh network again; if the second node finds that there is the master node in the network, the process ends. In one embodiment, the channel switching may be performed again.

The process of the second slave node joining the mesh network includes: when the slave node actively scans master node(s) in the surrounding environment, it actively broadcasts a probe request frame, and a master node in the network replies with a probe response frame after receiving the probe request frame. When receiving the probe response frame replied by the master node, the slave node may obtain the information of the master node and thus access the mesh network.

In the embodiment of the present application, after the slave node receives the switching command from the master node, the first slave node whose channel is successfully switched is added to the valid mesh network. For the second slave node whose channel is not successfully switched, the second node which is not connected to the valid mesh network exits the current invalid mesh network, scans the mesh network in the switched frequency channel, and accesses to the valid mesh network accessed by the first slave node. Therefore, the switching of nodes across frequency bands/bandwidth channels in the mesh network is realized, which makes up for the channel switching in the existing mesh standard protocol. In addition, in the switching process, only the master node needs to initiate a switching command, and it is not necessary to manually operate or restart each mesh node one by one, and the slave node can realize the automatic channel switching; and the channel switching is fast, which facilitates the channel switching of the mesh network, so that the nodes in the network can switch to any better channel at any time to operate, with higher data transmission performance, less disconnection, and easier network maintenance. For each node, as long as it is within a reasonable space range, for example, within the communication range of the master node, it can ensure that each mesh node can successfully switch channels, and there will be no failure of channel switching of a node. The switching channel of the present application is not limited by frequency bands, and not only supports the switching between single-frequency network card channels, but also supports the switching of channels across frequency bands for dual-frequency network cards.

Figure 2:
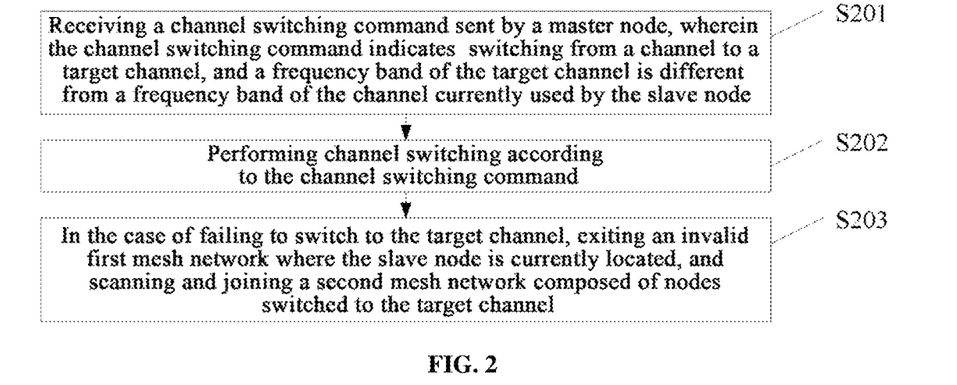
FIG. 2 is a first schematic diagram of a method for channel switching in a wireless mesh network according to an embodiment of the present application.

An embodiment of the present application further provides a method for channel switching in a wireless mesh network, which is applied to a slave node in the wireless mesh network, as shown in FIG. 2. The method includes:

S201, receiving a channel switching command sent by a master node, wherein the channel switching command indicates switching from a channel to a target channel, and a frequency band of the target channel is different from that of the channel currently used by the slave node.

The master node in the wireless mesh network broadcasts the channel switching command. In an example, the master node may broadcast the channel switching command based on the frequency band (the frequency band of the channel before switching) of the channel currently used by the slave node. The channel switching command indicates switching from a channel to a target channel. The specific content of the channel switching command may refer to channel switching commands in the same technology. In an example, the channel switching command may carry a channel switch announcement element and a channel switch parameter element, wherein the channel switch announcement element and the channel switch parameter element include a channel switching time and an identifier for indicating the target channel after switching. The slave node receives the channel switching command sent by the master node.

S202, performing channel switching according to the channel switching command.

The slave node tries to switch from a channel to the target channel according to the channel switching command. In an embodiment, the channel switching command further includes a channel switching time, and when the channel switching time is reached, the slave node switches from the currently used channel to the target channel.

S203, in the case of failing to switch to the target channel, exiting an invalid first mesh network where the slave node is currently located, and scanning and joining a second mesh network composed of nodes switched to the target channel.

If the slave node fails to successfully switch form the channel to the target channel, the slave node exits the invalid first mesh network, scans the second mesh network composed of nodes (containing the master node and other slave nodes) whose channels are successfully switched, and joins the second mesh network. In an example, a mesh network containing the master node is valid, and a mesh network not containing the master node is invalid.

In the embodiment of the present application, after receiving the switching command from the master node, the slave node whose channel is not successfully switched exits the invalid first mesh network, and scans and joins the second mesh network composed of nodes switched to the target channel. Therefore, the switching of nodes across frequency bands/bandwidth channels in the mesh network is realized, which makes up for the channel switching in the existing mesh standard protocol. In addition, in the switching process, only the master node needs to initiate a switching command, and it is not necessary to manually operate or restart each mesh node one by one, and the slave node can realize the automatic channel switching, and the channel switching is fast, which facilitates the channel switching of the mesh network, so that the nodes in the network can switch to any better channel at any time to operate, with higher data transmission performance, less disconnection, and easier network maintenance.

Figure 3:
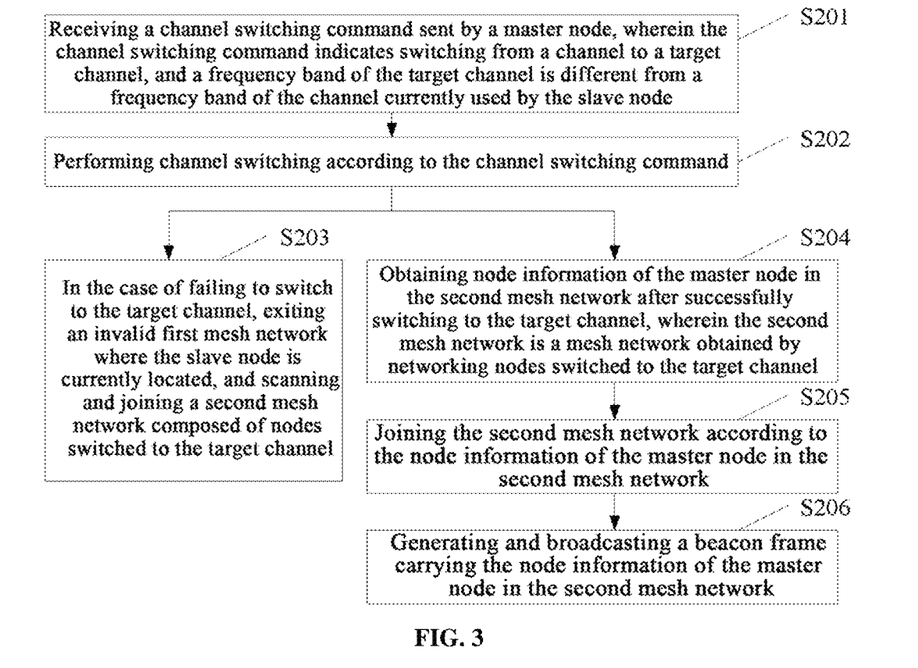
FIG. 3 is a second schematic diagram of a method for channel switching in a wireless mesh network according to an embodiment of the present application.

In an embodiment, referring to FIG. 3, after the channel switching is performed according to the channel switching command, the method further includes:

S204, obtaining node information of the master node in the second mesh network after successfully switching to the target channel, wherein the second mesh network is a mesh network obtained by networking nodes switched to the target channel.

In an example, after successfully switching to the target channel, the slave node scans at the frequency band of the target channel to obtain the beacon frame carrying the node information of the master node in the second mesh network.

S205, joining the second mesh network according to the node information of the master node in the second mesh network.

S206, generating and broadcasting a beacon frame carrying the node information of the master node in the second mesh network.

Nodes (including master node and slave node) switched to the target channel will be networked, and the mesh network obtained by networking the nodes switched to the target channel is called the second mesh network. Specifically, after the master node switches to the target channel, the master node will broadcast a beacon frame based on the frequency band of the target channel, and the beacon frame includes the node information of the master node. After receiving the beacon frame, the slave node will network with the master node according to the node information of the master node in the beacon frame, so as to join the second mesh network. The slave node that has joined the second mesh network will also broadcast the beacon frame carrying the node information of the master node to help slave nodes that have not joined the second mesh network for networking. In an example, the beacon frame may also include an identifier of the second mesh network, and the slave node may also mark the second mesh network as valid.

In the embodiment of the present application, for the slave node whose channel is successfully switched, it is directly networked to join the second mesh network, which realizes the switching of nodes across frequency bands/bandwidth channels in the mesh network, and the slave node will also broadcast the beacon frame carrying the node information of the master node in the second mesh network, which can increase the probability of other slave node(s) receiving the beacon frame, thus increasing the probability of slave nodes successfully joining the second mesh network.

Figure 4:
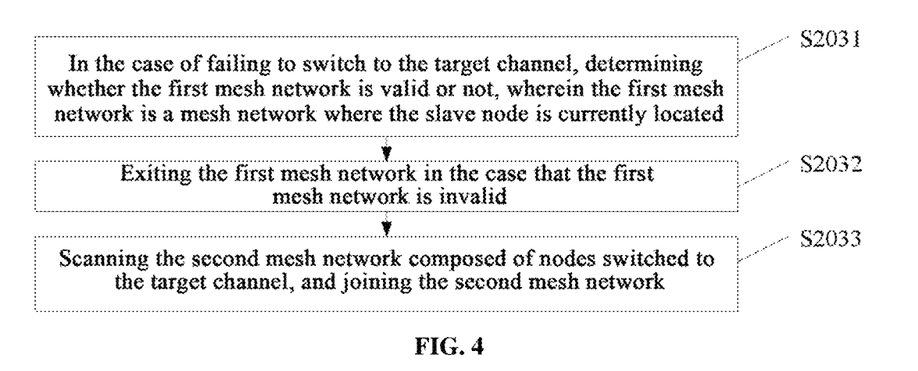
FIG. 4 is a schematic diagram of a possible implementation of step 5203 in the method for channel switching in the wireless mesh network according to the embodiment of the present application.

In an embodiment, referring to FIG. 4, the case of failing to switch to the target channel, exiting an invalid first mesh network where the slave node is currently located, and scanning and joining a second mesh network composed of nodes switched to the target channel includes the followings.

S2031, in the case of failing to switch to the target channel, determining whether the first mesh network is valid, wherein the first mesh network is a mesh network where the slave node is currently located.

The first mesh network is the network where each node is located before channel switching. If the first mesh network includes the master node, the first mesh network is valid, and if it does not include the master node, the first mesh network is invalid. In an example, in the case of failing to switch to the target channel, determining whether the first mesh network is valid or not includes:

Step 1, in the case of failing to switch to the target channel, network information is synchronized with other nodes in the first mesh network, wherein the network information of the first mesh network is used to indicate whether there is a master node in the first mesh network.

Step 2, determining whether the first mesh network is valid or not according to the network information of the first mesh network, wherein if the network information of the first mesh network indicates that there is no master node in the first mesh network, the first mesh network is determined as invalid; if the network information of the first mesh network indicates that there is a master node in the first mesh network, the first mesh network is determined as valid.

A slave node whose channel is not successfully switched due to the unsuccessful channel switching will remain in the first mesh network, and synchronize network information in the first mesh network by broadcasting through the second layer of network. The network information of the first mesh network is used to indicate whether there is a master node in the first mesh network. In an example, the network information synchronized in the first mesh network includes one or more of network health status, throughput information, mesh path information of each node in the first mesh network, and status information of the overall mesh network, mesh heartbeat, network validity, mesh network topology, master node information, etc. After the network information of the first mesh network is synchronized, whether the first mesh network is valid or not is determined depending on whether there is a master node in the first mesh network.

S2032, exiting the first mesh network in the case that the first mesh network is invalid.

If finding that there is no master node in the first mesh network, that is, the first mesh network is invalid, the slave node exits the current invalid first mesh network and disconnects the current mesh network connection. In an example, if there is a master node in the first mesh network, that is, the first mesh network is valid, the slave node still remains in the first mesh network.

S2033, scanning the second mesh network composed of nodes switched to the target channel, and joining the second mesh network.

After exiting the first mesh network, the slave node actively scans master node(s) in the surrounding environment. For example, the slave node actively broadcasts a probe request frame, and a master node in the second mesh network replies with a probe response frame after receiving the probe request frame. When receiving the probe response frame replied by the master node, the slave node may obtain the information of the master node and access the second mesh network. In an example, the slave node may broadcast the probe request frame on each channel in turn, and after sending the probe request frame on the target channel, the slave node will receive the probe response frame of the master node in the second mesh network, and the slave node may join the second mesh network according to the probe response frame.

In an example, the master node in the second mesh network broadcasts the beacon frame through a multi-channel negotiation mechanism for mesh, so even if the slave node is not in the second mesh network, the beacon frame may be received through the WIFI protocol. In an example, each slave node in the second mesh network may also broadcast the beacon frame, so as to improve the probability of the slave node that fails to switch channels receiving the beacon frame. The scanning and switching to the second mesh network composed of nodes switched to the target channel includes: scanning a beacon frame carrying the node information of the master node switched to the target channel; joining the second mesh network according to the node information of the master node in the beacon frame. After exiting the first mesh network, the slave node scans in the frequency band of the target channel, and after the beacon frame is scanned, the slave node obtains the node information of the master node in the beacon frame; and when the ID of the master node in the node information of the beacon frame is the same as the ID of the master node to which the slave node is connected before channel switching, the slave node requests to join the scanned mesh network.

In an example, scanning the beacon frame carrying the node information of the master node switched to the target channel, and joining the second mesh network according to the node information of the master node in the beacon frame includes: in a process of scanning channels in sequence according to a preset scanning rule, if a beacon frame is scanned in the currently scanned channel, determining whether an identifier of a master node carried in the currently scanned beacon frame is the same as an identifier of a master node connected by the slave node last time; if the identifier of a master node carried in the currently scanned beacon frame is the same as the identifier of a master node connected by the slave node last time, joining the second mesh network according to the node information of the master node in the currently scanned beacon frame. A preset scanning rule may be set according to the actual situations. If the identifier of the master node carried in the currently scanned beacon frame is different from the identifier of the master node connected by the slave node last time, the channel scanning will continue.

Figure 5:
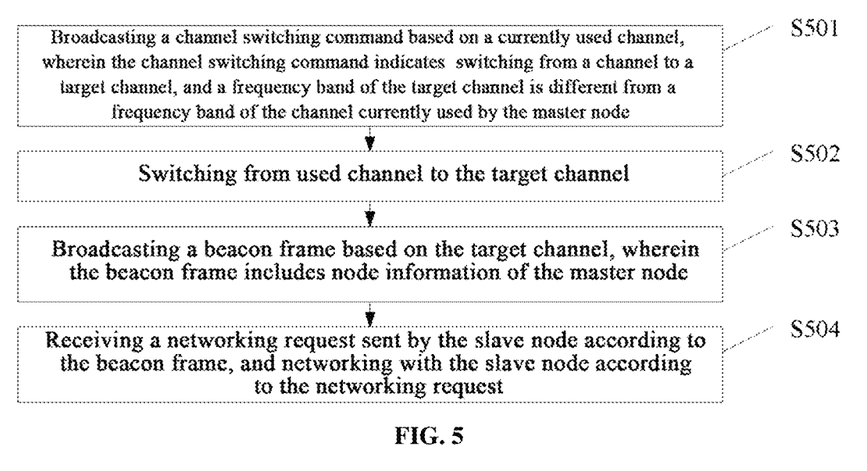
FIG. 5 is a third schematic diagram of a method for channel switching in a wireless mesh network according to an embodiment of the present application.

An embodiment of the present application also provides a method for channel switching in wireless mesh network, which is applied to a master node in the wireless mesh network, as shown in FIG. 5. The method includes the followings.

S501, broadcasting a channel switching command based on a currently used channel, wherein the channel switching command indicates switching from a channel to a target channel, and a frequency band of the target channel is different from the frequency band of the channel currently used by the master node.

The master node broadcasts the channel switching command by using the frequency band of the currently used channel.

S502, switching from the used channel to the target channel.

The master node switches from the used channel to the target channel. In an embodiment, the channel switching command also includes a channel switching time, and switching from the used channel to the target channel includes switching from the used channel to the target channel when the channel switching time is reached.

S503, broadcasting a beacon frame based on the target channel, wherein the beacon frame includes node information of the master node.

After the master node switches to the target channel, the beacon frame is broadcast by using the frequency band of the target channel.

S504, receiving a networking request sent by the slave node according to the beacon frame, and networking with the slave node according to the networking request.

After receiving the beacon frame, the slave node will send a networking request according to the node information of the master node in the beacon frame, so as to request to join the mesh network where the master node is located. For the specific execution process of the slave node, refer to the relevant descriptions in other embodiments of the present application, which will not be repeated here. The master node receives the networking request from the slave node, and allows the slave node to access the mesh network after verification.

An embodiment of the present application further provides a channel switching apparatus in a wireless mesh network, which is applied to a slave node in the wireless mesh network, and the apparatus includes:

a channel switching command receiving module configured for receiving a channel switching command sent by a master node, wherein the channel switching command indicates switching from a channel to a target channel, and a frequency band of the target channel is different from the frequency band of the channel currently used by the slave node;

a channel switching executing module configured for performing channel switching according to the channel switching command;

a mesh network scanning module configured for, in the case of failing to switch to the target channel, exiting an invalid first mesh network where the slave node is currently located, and scanning and joining a second mesh network composed of nodes switched to the target channel.

In an implementation, the apparatus further includes:

a node information obtaining module configured for obtaining node information of the master node in the second mesh network after successfully switching to the target channel, wherein the second mesh network is a mesh network obtained by networking the nodes switched to the target channel;

a mesh joining module configured for joining the second mesh network according to the node information of the master node in the second mesh network;

a beacon frame generating module configured for generating and broadcasting a beacon frame carrying the node information of the master node in the second mesh network.

In an embodiment, the node information obtaining module is specifically configured for: after successfully switching to the target channel, scanning at the frequency band of the target channel to obtain the beacon frame carrying the node information of the master node in the second mesh network.

In an embodiment, the mesh network scanning module includes:

a validity determining sub-module configured for determining whether the first mesh network is valid or not in the case of failing to switch to the target channel, wherein the first mesh network is a mesh network where the slave node is currently located;

a mesh exiting sub-module configured for exiting the first mesh network in the case that the first mesh network is invalid;

a mesh scanning sub-module configured for scanning the second mesh network composed of nodes switched to the target channel, and joining the second mesh network.

In an embodiment, the validity determining sub-module is specifically configured for: synchronizing network information with other nodes in the first mesh network in the case of failing to switch to the target channel, wherein the network information of the first mesh network is used to indicate whether there is a master node in the first mesh network; determining whether the first mesh network is valid or not according to the network information of the first mesh network, wherein if the network information of the first mesh network indicates that there is no master node in the first mesh network, the first mesh network is determined as invalid; if the network information of the first mesh network indicates that there is a master node in the first mesh network, the first mesh network is determined as valid.

In an embodiment, the mesh network scanning sub-module is specifically configured for: scanning a beacon frame carrying the node information of the master node switched to the target channel, and joining the second mesh network according to the node information of the master node in the beacon frame.

In an embodiment, the mesh network scanning sub-module is specifically configured for: in a process of scanning channels in sequence according to a preset scanning rule, if a beacon frame is scanned in the currently scanned channel, determining whether an identifier of a master node carried in the currently scanned beacon frame is the same as an identifier of a master node connected by the slave node last time; if the identifier of a master node carried in the currently scanned beacon frame is the same as the identifier of a master node connected by the slave node last time, joining the second mesh network according to the node information of the master node in the currently scanned beacon frame.

An embodiment of the present application further provides an apparatus for channel switching in a wireless mesh network, which is applied to a master node in the wireless mesh network, the apparatus includes:

a channel switching command broadcasting module configured for broadcasting a channel switching command based on a currently used channel, wherein the channel switching command indicates switching from a channel to a target channel, and a frequency band of the target channel is different from the frequency band of the channel currently used by the master node;

a target channel switching module configured for switching from the used channel to the target channel;

a beacon frame broadcasting module configured for broadcasting a beacon frame based on the target channel, wherein the beacon frame includes node information of the master node;

a networking request receiving module configured for receiving a networking request sent by the slave node according to the beacon frame, and networking with the slave node according to the networking request.

In an embodiment, the channel switching command further includes a channel switching time, and the target channel switching module is specifically configured for switching from the used channel to the target channel when the channel switching time is reached.

Figure 6:
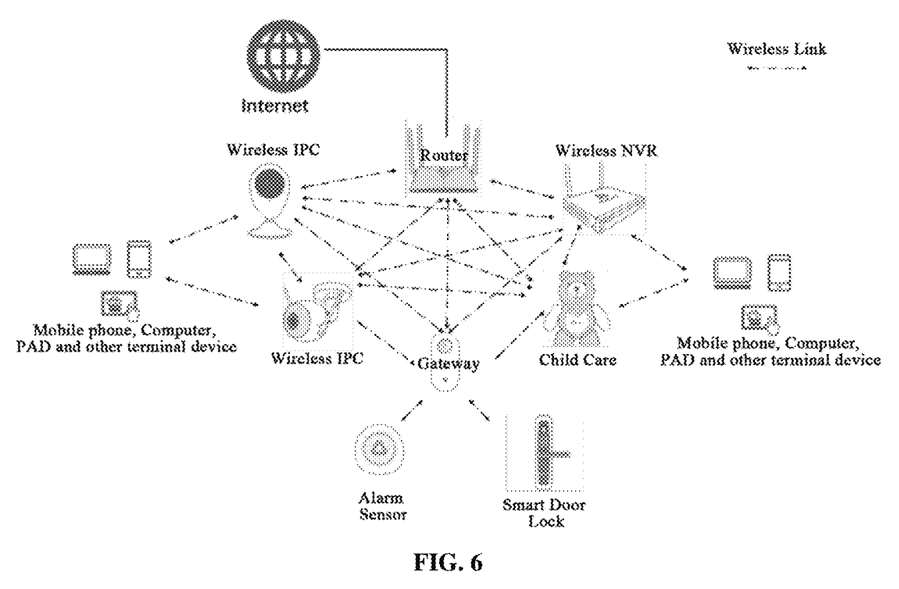
FIG. 6 is a schematic diagram of a mesh network composed of various wireless devices in a smart home system according to an embodiment of the present application.

Referring to FIG. 6, FIG. 6 is a schematic diagram of a mesh network composed of various wireless devices in a smart home system. The smart home system includes a security monitoring subsystem, a video playing subsystem, an entrance guard subsystem, an electrical subsystem supporting wireless, and an access system for each subsystem to be accessed. Specifically, as shown in FIG. 6.

The security monitoring subsystem includes an Internet Protocol Camera (IPC) and a child care robot, the video playing subsystem includes a Network Video Recorder (NVR), and the entrance guard subsystem includes a smart door lock. The electrical subsystem supporting wireless includes various wireless devices such as alarm sensor, computer, mobile phone, PAD (Portable Android Device), wireless light bulb (not shown in the figure), wireless household appliance (refrigerator, washing machine, microwave oven, etc.) (not shown in the figure). The access system includes a gateway and a router.

Each of the above wireless devices may be used as a node, and each node may be connected to each other, and each node has multiple connection channels. For example, wireless network hard disk video recorder is respectively connected to the router, wireless IPC, gateway, mobile phone and child care robot, and the wireless IPC is respectively connected to the router, NVR, gateway, mobile phone and child care robot. The connections of all nodes form a mesh network.

In the mesh network connected to the smart home system, the router is usually used as a master node, and other nodes except the router are used as slave nodes. By applying the method for channel switching according to the present application, the channel switching between different frequency bands can be realized.

Figure 7:
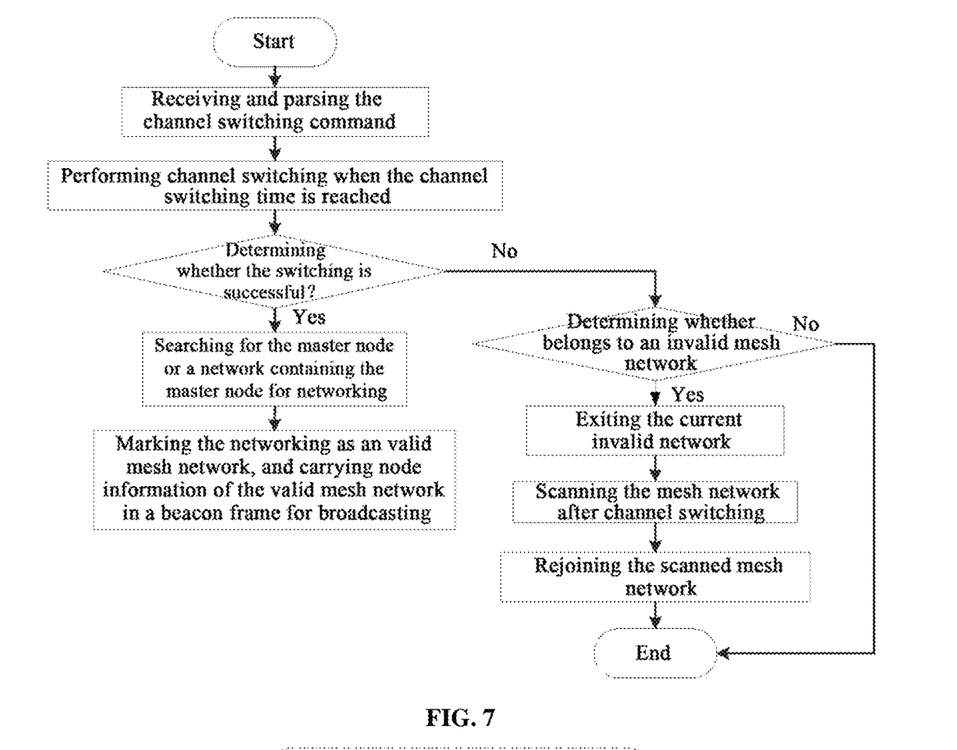
FIG. 7 is a flowchart of channel switching of wireless devices in the smart home system according to an embodiment of the present application.

Referring to FIG. 7, FIG. 7 is a flowchart of channel switching of wireless devices in the smart home system. The specific process is as follows:

a router as a master node broadcasts a channel switching command and initiates channel switching.

For each wireless device as a slave node in the smart home system except the router, any slave node:

receives and parses the channel switching command;

each slave node performs channel switching when the channel switching time is reached;

determining whether itself switches successfully; if the slave node switches successfully, the slave node searches for the master node or searches for a network containing the master node for networking, marks the networking as a valid mesh network, and carries node information of the valid mesh network into a beacon frame for broadcasting.

If the slave node dose not switch successfully, the slave node determines whether it belongs to an invalid mesh network by searching for the master node in the accessed mesh network, that is, synchronize a status of the mesh network in the current mesh network by broadcasting through the second layer of network. After synchronizing the information of the current mesh network, the salve nodes determines whether the slave node belongs to an invalid mesh network depending on whether there is master node information. If belonging to an invalid mesh network, the slave node exits the current invalid mesh network and scans the mesh network after channel switching. When the scanned beacon frame contains the master node information, and the master node information is the same as the master node information in the node information of the valid first mesh network carried in the broadcast beacon frame, for example, when the private IE field carried by the beacon frame or probe response frame broadcast by the mesh node scanned by the slave node contains a valid mesh network mark information, and a service set identifier (ssid) of the slave node is consistent with the ssid of the scanned mesh node, the slave node requests to join the scanned mesh network again.

In the above smart home system, after the dual-frequency wireless device supporting mesh establishes mesh networking, the mesh network of the wireless device may be switched from the current operating frequency band to another frequency band during the communication process of the mesh network on the 2G or 5G frequency band, thus realizing the channel switching of the mesh network between different frequency bands and different bandwidths. After the channel switching is successful, the mesh connection can be automatically re-established and the mesh networking can be restored, and the communication capability can be restored to normal.

Figure 8:
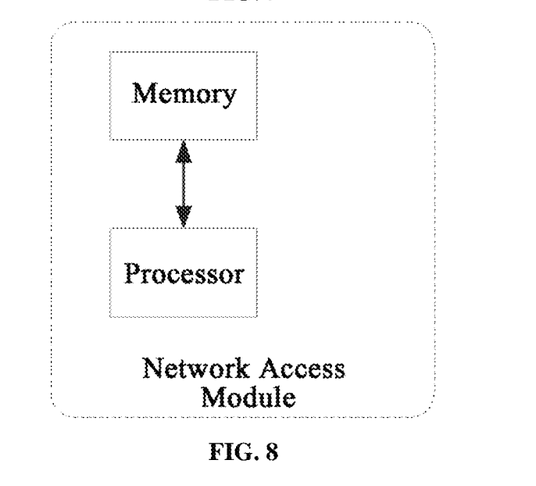
FIG. 8 is a schematic diagram of a network access module (network card) in a wireless device according to an embodiment of the present application.

Referring to FIG. 8, FIG. 8 is a schematic diagram of a network access module (network card) in a wireless device. The network access module includes a memory and a processor, wherein, the memory stores application programs, the processor executes the application programs to implement any of the methods for channel switching in the wireless mesh network as shown in FIG. 7.

The memory may include Random Access Memory (RAM) or Non-Volatile Memory (NVM), such as at least one disk memory. Optionally, the memory may also be at least one storage device located far away from the aforementioned processor.

The above processor may be a general-purpose processor, including a Central Processing Unit (CPU), a Network Processor (NP), etc. It may also be Digital Signal Processing (DSP), Application Specific Integrated Circuit (ASIC), Field-Programmable Gate Array (FPGA) or other programmable logic devices, discrete gate or transistor logic devices, and discrete hardware components.

An embodiment of the present application further provides a computer readable storage medium having stored thereon computer programs that, when executed by a processor, cause the processor to implement the following steps:

a slave node receives a channel switching command broadcast by a master node to perform channel switching;

the slave node determines whether the channel switching is successful, if the channel switching is successful, the slave node searches for the master node or a network containing the master node for networking, otherwise, the slave node determines whether it has accessed an invalid mesh network currently, if the slave node has accessed an invalid mesh network currently, the slave node exits the current invalid mesh network, scans a mesh network after the channel switching, and joins the scanned mesh network.

As for the apparatus/network side device/storage medium embodiment, it is basically similar to the method embodiment, so the description thereof is relatively simple. For relevant parts, please refer to the partial description of the method embodiment.

The relationship terms used herein, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

The above descriptions are only preferred embodiments of the present application and are not intended to limit the present application. Any modification, equivalent replacement, improvement made within the spirit and principle of the present application shall be included in the scope of protection of the present application.

What is claimed is:

1. A method for channel switching in a wireless mesh network, comprising:
   a slave node in the wireless mesh network receiving a channel switching command broadcast by a master node to perform channel switching;
   the slave node determining whether the channel switching is successful, if the channel switching is successful, the slave node searching for the master node or a mesh network containing the master node for networking, if the channel switching is not successful, the slave node exiting a current invalid mesh network, scanning a mesh network after the channel switching, and joining in the scanned mesh network,
   wherein after the slave node is successfully switched, the method further comprises: marking the networking as a valid mesh network, adding node information of the valid mesh network into a beacon frame, and broadcasting the beacon frame carrying the node information of the valid mesh network.

2. The method for channel switching according to claim 1, wherein exiting the current invalid mesh network comprises:
   the slave node receiving a status of the current mesh network synchronized in the current mesh network broadcast through a second layer of network by the master node, and filling a valid mesh network node mark information into the beacon frame;
   determining whether the current mesh network belongs to an invalid mesh network depending on whether there is master node information based on the synchronized information of the current mesh network, and if the current mesh network belongs to an invalid mesh network, exiting the current invalid mesh network;
   wherein the beacon frame is a beacon frame or a probe response frame, and the valid mesh network mark information is filled into a private IE field of the beacon frame or probe response frame.

3. The method for channel switching according to claim 2, wherein scanning the mesh network after the channel switching, and joining in the scanned mesh network comprises:
   when the private IE field carried by the beacon frame or probe response frame broadcast by the mesh node scanned by the slave node contains the valid mesh network mark information, and a service set identifier ssid of the slave node is consistent with a service set identifier ssid of the scanned mesh node, the slave node joining the valid mesh network.

4. The method for channel switching according to claim 3, wherein joining in the scanned mesh network comprises:
   the slave node broadcasting a probe request frame;
   the slave node receiving a probe response frame from the master node, wherein the probe response frame carries the master node information comprising the mesh network valid mark information;
   the slave node obtaining the master node information according to the master node information carried in the probe response frame, and establishing a wireless link.

5. The method for channel switching according to claim 3, wherein the channel switching command comprises the beacon frame or the probe response frame, and wherein a channel switch announcement element and a channel switch parameter element carried in the frame comprise a channel switching time and a channel switching indication for indicating a switching target.

6. A wireless device, comprising a network access module supporting wireless local area network access, wherein the network access module comprises a memory and a processor, wherein:
   the memory stores thereon application programs;
   the processor executes the application programs to implement steps in the method for channel switching in the wireless mesh network according to claim 1.

7. A Non-transitory computer readable storage medium having stored thereon computer programs that, upon executed by a processor, cause the processor to implement steps in the method for channel switching in the wireless mesh network according to claim 1.

8. A method for channel switching in a wireless mesh network, comprising:
   each slave node in a wireless mesh network receiving a channel switching command broadcast by a master node, and each slave node performing channel switching respectively;
   a first slave node whose channel is successfully switched searching for the master node or searching for a mesh network containing the master node for networking;
   a second slave node whose channel is not successfully switched determining whether it has accessed an invalid mesh network currently, if the second slave node has accessed the invalid mesh network, the second slave node exiting the current invalid mesh network, scanning a mesh network after channel switching, and joining in the scanned mesh network.

9. A method for channel switching in a wireless mesh network, which is applied to a slave node in the wireless mesh network, the method comprises:
   receiving a channel switching command sent by a master node, wherein the channel switching command indicates switching from a channel to a target channel, and a frequency band of the target channel is different from a frequency band of the channel currently used by the slave node;

performing channel switching according to the channel switching command;

in a case of failing to switch to the target channel, exiting an invalid first mesh network where the slave node is currently located, and scanning and joining a second mesh network composed of nodes switched to the target channel, wherein after the channel switching is performed according to the channel switching command, the method further comprises:

obtaining node information of the master node in the second mesh network after successfully switching to the target channel, wherein the second mesh network is a mesh network obtained by networking the nodes switched to the target channel;

joining the second mesh network according to the node information of the master node in the second mesh network;

generating and broadcasting a beacon frame carrying the node information of the master node in the second mesh network.

10. The method according to claim 9, wherein obtaining the node information of the master node in the second mesh network after successfully switching to the target channel comprises:

after successfully switching to the target channel, scanning at the frequency band of the target channel to obtain the beacon frame carrying the node information of the master node in the second mesh network.

11. The method according to claim 9, wherein, in the case of failing to switch to the target channel, exiting the invalid first mesh network where the slave node is currently located, and scanning and joining the second mesh network composed of nodes switched to the target channel comprises:

determining whether the first mesh network is valid or not in the case of failing to switch to the target channel, wherein the first mesh network is a mesh network where the slave node is currently located;

exiting the first mesh network in the case that the first mesh network is invalid;

scanning the second mesh network composed of the nodes switched to the target channel, and joining the second mesh network.

12. The method according to claim 11, wherein determining whether the first mesh network is valid or not in the case of failing to switch to the target channel comprises:

synchronizing network information with other nodes in the first mesh network in the case of failing to switch to the target channel, wherein the network information of the first mesh network is used to indicate whether there is a master node in the first mesh network;

determining whether the first mesh network is valid or not according to the network information of the first mesh network, if the network information of the first mesh network indicates that there is no master node in the first mesh network, determining that the first mesh network is invalid; if the network information of the first mesh network indicates that there is a master node in the first mesh network, determining that the first mesh network is valid.

13. The method according to claim 11, wherein scanning the second mesh network composed of the nodes switched to the target channel, and joining the second mesh network comprises:

scanning a beacon frame carrying the node information of the master node switched to the target channel, and joining the second mesh network according to the node information of the master node in the beacon frame.

14. The method according to claim 13, wherein scanning the beacon frame carrying the node information of the master node switched to the target channel, and joining the second mesh network according to the node information of the master node in the beacon frame comprises:

in a process of scanning channels in sequence according to a preset scanning rule, if the beacon frame is scanned in the currently scanned channel, determining whether an identifier of the master node carried in the currently scanned beacon frame is the same as an identifier of a master node connected by the slave node last time;

if the identifier of the master node carried in the currently scanned beacon frame is the same as the identifier of a master node connected by the slave node last time, joining the second mesh network according to the node information of the master node in the currently scanned beacon frame.

15. A wireless mesh network system comprising a wireless device as a node, wherein each slave node in the wireless mesh network receives a channel switching command broadcast by a master node, and each slave node performs channel switching respectively;

a first slave node whose channel is successfully switched searches for the master node or searches for a mesh network containing the master node for networking;

a second slave node whose channel is not successfully switched determines whether it has accessed an invalid mesh network currently, if the second slave node has accessed the invalid mesh network, the second slave node exits the current invalid mesh network, scans a mesh network after channel switching, and joins the scanned mesh network.

* * * * *